Patented May 4, 1937

2,079,207

UNITED STATES PATENT OFFICE 2,079,207

STORAGE BATTERY PLATE

Harold Hibbert, Montreal, Quebec, Canada, and Willard L. Reinhardt, Shaker Heights, Ohio, assignors to Willard Storage Battery Company, Cleveland, Ohio, a corporation of West Virginia No Drawing. Application October 1, 1934,
Serial No. 746,408

6 Claims. (Cl. 136—26)

This invention relates to storage batteries of the lead-acid type and has particular reference to the use of an improved activating material in the paste or active material of storage battery plates, especially negative plates, and has for its object to provide a substance which, when mixed with the oxide or oxides utilized in forming the paste or is otherwise incorporated in the paste or active material, will increase or maintain the capacity of the plates.

In previous patents on this subject, various lignins and humins are described as being utilized for this purpose. For example, in U. S. Patent No. 1,505,990 granted to Theodore A. Willard, the use of lignin is described, and in U. S. Patent No. 1,817,846 granted to Willard L. Reinhardt, humic substances are employed for this purpose. These activating materials are commonly referred to as expanders although in addition to their expander function they have the very important function of maintaining the capacity of the plates.

The present invention is, in certain respects, an improvement over the subject matter of Patent No. 1,505,990 utilizing lignin for an expander, since by the present invention lignin derivatives are produced and are incorporated in the storage battery paste or active material. In isolating these prior activating materials, it was considered advisable to separate them from the cellulose and other constituents accompanying them in the vegetable or plant material in which they naturally occur, and, for this purpose, chemical reagents, such as sulphuric acid or other suitable mineral acid, have been employed. In the processes described in the above patents, the extractive reagent did not enter into chemical relation with the lignin.

We have now found that the use of much milder reagents offers many advantages over reagents of previous processes and that the resulting lignin derivatives are characterized by high efficiency when incorporated with the oxide or oxides of lead used in the manufacture of storage battery plates for improving the performance of the storage batteries.

These new extraction agents for the lignin comprise all organic products characterized by the presence of one or more hydroxyl groups, for example, the class of alcohols, which includes ethyl alcohol, ethylene glycol, glycerol, etc., the class of phenols, which includes ordinary phenol or carbolic acid, cresols, resorcinol, and arylalkyl alcohols such as benzyl alcohols.

To facilitate the extraction of lignin by the use of these reagents, it is desirable to have present a small amount of a catalyst, such as hydrochloric acid or hydrobromic acid, under the influence of which the hydroxyl-containing agent enters into reaction with the lignin present in the wood or other vegetable substance being treated, as a result of which a new lignin derivative is formed, the union of the lignin to the new organic constituent being effected through the medium of one or more oxygen linkages to one or more new carbon atoms. This can be explained on the basis of commonly accepted knowledge that the structure of lignin in nature is an aggregate containing a considerable number of free hydroxyl groups, each, as is well known, representing the union of a hydrogen atom with an oxygen atom, the latter being connected in turn to a carbon atom. In the chemical reaction that takes place between the lignin and the hydroxyl-containing agent in the presence of a catalyst, a carbon atom of the hydroxyl-containing agent becomes attached to the oxygen atom of a hydroxyl group in the lignin aggregate, the hydrogen atom of the group being displaced in the process. In this manner there is produced a new oxygen linkage between a lignin oxygen atom and a carbon atom in the hydroxyl-containing agent. These lignin derivatives may be referred to as alcohol or alkoxy lignin and phenol or aryloxy lignin, as well as arylalkoxy lignin, for example benzyl alcohol lignin.

Such lignin derivatives are, in general, soluble in organic solvents and alkalies but are not soluble in water, and, when incorporated with the oxide or oxides used in forming the paste for storage battery plates or in the active material thereof cause a remarkable increase in the efficiency of operation of the battery.

Wood is preferably employed as the raw material from which the modified lignin or lignin derivative is obtained, although we do not limit ourselves to this raw material since practically all other vegetable substances, such as hemp, jute, corn-cobs, etc., may also be used. Many of the woods may be employed for this purpose, but we prefer one of the coniferous woods, such as spruce.

One of the lignin derivatives may be prepared from a reagent of the alcohol class as follows:

The wood (or other desired vegetable material) is finely ground. No particular degree of fineness is required although usually the finer the material the less the time required for the reaction to take place. This finely divided material is then mixed with a suitable hydroxyl reagent, in this instance of the alcohol class or group, which, by way of example, may be ethylene glycol. Preferably the dry wood meal is mixed with about eight (8) to ten (10) times the amount of glycol by weight, the glycol containing a small amount of a catalyst, such as concentrated anhydrous hydrochloric acid or hydrobromic acid, preferably around 0.2% to 3% by weight, although we do not limit ourselves to these proportions as they are not essential to the success of the process. The mixture of glycol, hydrochloric acid or other catalyst, and the finely divided raw material is then heated to a temperature of about 125° C. for several hours, for example, eight (8) to ten (10) hours.

The reaction mixture is then filtered and the mother liquor diluted with several times the volume of water, whereupon glycol lignin is precipitated out and, after washing and drying, can be used without further treatment for incorporation with the lead oxide or oxides used in forming storage battery plates. It will be understood, of course, that the process will be the same regardless of the particular reagent of the alcohol class which is used and that instead of glycol we may use any other monohydric or polyhydric alcohol, such as methyl or ethyl alcohol, glycerol, benzyl alcohol, etc.

To produce a phenol lignin there is mixed together about ten (10) parts by weight of dry, finely divided wood or other plant material containing lignin with about one hundred (100) parts by weight of any one of the phenols and about one cubic centimeter (1 cc.) of concentrated hydrochloric acid. The mixture is then heated for about thirty (30) to sixty (60) minutes at about 80° to 90° C., the mixture being meanwhile vigorously agitated. The hot reaction product is filtered and the filtrate distilled under reduced pressure to remove the excess phenol present. The residual viscous liquid is dissolved in alcohol, then the alcoholic solution is poured into water, whereupon the phenol lignin is precipitated and, after washing and drying, is ready for use. Instead of using finely divided wood or other vegetable substance containing lignin, we may substitute an extracted lignin, for example, waste sulphite liquor, an alcohol lignin, etc., from which phenol lignin or phenolated lignin may be prepared by the method described above.

When using one of the arylalkyl alcohols, the process described in connection with the alcohol group will be followed.

With any of these processes above described, the lignin derivative is precipitated as a very fine powder.

In some instances, we may employ as the reagent for the extraction of lignin two or more hydroxyl-containing derivatives in the alcohol class or in the phenol class or in the class of arylalkyl alcohols, or a mixture of derivatives from different classes may be employed. In all cases, the resulting material possesses the desirable characteristic property of increasing the battery efficiency by maintaining the capacity of the plates when incorporated in the paste employed in making the storage battery plates, or in the active material.

Preferably our improved expander or lignin derivative is used only in the negative plates as we find that if used also in the positive plates it does not improve the action of the positive plates.

In making up the paste, we thoroughly mix with the oxide or oxides of lead about .1% to 1% by weight of the lignin derivative, the actual amount being varied in accordance with the particular use and the particular temperature conditions under which the battery is to be used. The lower the temperature, the greater the amount of lignin derivative used, up to about a maximum of 1%. The lignin derivative or activating agent may be mixed with the oxide or oxides of lead prior to shipment thereof to the battery manufacturers, or it may be mixed with it at the time the paste is made up. In some instances, when the lignin derivative is still in solution form, as made by one of the processes mentioned above, it may be incorporated either in the paste of the pasted plate or in the active material of the formed or charged plate by the precipitation method described in the Reinhardt Patent No. 1,817,486.

In addition to the lignin derivative, we may mix with the oxide or oxides or with the paste a small amount of a second expander, such, for example, as barium sulphate, but generally the use of a second expander is unnecessary.

It will be understood that while we have mentioned specific proportions, processes, temperatures, etc., in the production of our improved product, and have stated that finely divided wood is the preferred material, we do not desire to be confined to these proportions or to any particular raw material or any specific process, but aim in our claims to cover all changes and modifications which do not involve a departure from the spirit and scope of the invention.

Having thus described our invention, we claim:

1. Material for use in making storage battery plates comprising lead compound having mixed therewith a lignin derivative prepared by the extraction of lignin with an hydroxyl-containing organic compound.

2. A lead compound for storage battery plates having an alcohol lignin incorporated therein.

3. A lead compound for storage battery plates having a phenol lignin incorporated therein.

4. A lead compound for storage battery plates having an arylalkoxy lignin incorporated therein.

5. A lead compound for storage battery plates having incorporated therein an activating material consisting chiefly of a derivative of lignin, said derivative being characterized by the presence of an oxygen linkage between the original lignin and a new carbon atom, the latter displacing the hydrogen atom of a hydroxyl group of the original lignin.

6. A lead compound for storage battery plates having incorporated therein an activating material consisting chiefly of a lignin derivative characterized by the presence of a multiplicity of oxygen linkages to which are attached new carbon atoms, the latter displacing the hydrogen atoms of hydroxyl groups of the original lignin.

HAROLD HIBBERT.
WILLARD L. REINHARDT.